US005204751A

United States Patent [19]

Salyer et al.

[11] Patent Number: 5,204,751

[45] Date of Patent: Apr. 20, 1993

[54] TARGET SUPPORT FOR PROJECTION CATHODE RAY TUBE

[75] Inventors: Kenneth S. Salyer; Peter J. Czichon, both of Lexington, Ky.

[73] Assignee: Hughes Display Products, Lexington, Ky.

[21] Appl. No.: 568,974

[22] Filed: Aug. 17, 1990

[51] Int. Cl.$^5$ .............................................. H04N 5/645

[52] U.S. Cl. .................................... 358/248; 248/180

[58] Field of Search ...................... 358/239, 248, 237; 313/477 R, 478; 353/31; 248/180, 481

[56] References Cited

U.S. PATENT DOCUMENTS

| | | | |
|---|---|---|---|
| 2,329,978 | 9/1943 | Brunson | 248/180 |
| 2,438,479 | 3/1948 | Patrosio et al. | 248/180 |
| 2,476,898 | 7/1949 | Nicoll | 358/239 |
| 2,940,984 | 6/1960 | Fell | 248/180 |
| 3,402,613 | 9/1968 | Neusel et al. | 359/874 |
| 3,581,231 | 5/1971 | Freiberg | 378/107 |
| 4,177,400 | 12/1979 | Hergenrother et al. | 358/239 |
| 4,298,248 | 11/1981 | Lapp | 248/481 |

*Primary Examiner*—Edward L. Coles, Sr.
*Assistant Examiner*—Fan Lee
*Attorney, Agent, or Firm*—Terje Gudmestad; Jeannette M. Walder; Wanda K. Denson-Low

[57] ABSTRACT

An improved target assembly for a projection cathode ray tube is provided wherein the target member is protected from being inadvertently tilted, and thus the tube defocused when subjected to shock loading. The target member is supported by a shaft screw, which in turn is mounted on an adjustment pad for initially tilting the target member to focus the image. The positive locking elements includes external threads on the shaft screw received by inside threads of a center aperture in the adjustment pad. A locking nut is utilized to jam the shaft screw against the pad, and thereby load the cooperating threads. In addition, a threaded mounting stud of the target member engages internal threads of the shaft screw at the opposite end, and a locking set screw inside the shaft engages these internal threads and is tightened against the stud to load these threads.

10 Claims, 1 Drawing Sheet

TARGET SUPPORT FOR PROJECTION CATHODE RAY TUBE

BACKGROUND OF THE INVENTION

The present invention relates to projection cathode ray tubes, and more particularly, to an improved mounting for the target assembly of the tube to prevent defocusing of the image due to inadvertent shock loading.

The use of projection cathode ray tubes to project electronically generated images onto viewing screens is well known in the art. These tubes are utilized in various display environments, such as in flight simulators for training aircraft pilots. An electron beam generates an image on a sensitive coating of the target of the tube and by projection through a Schmidt optical projection system the image appears on a screen, such as in the flight simulator in front of the pilots to simulate the view from a cockpit of the aircraft. In such an arrangement, it is critical to maintain a sharp image in order to satisfy the overall objective of creating as close to a live training environment as possible. A sharp image of the simulated view from the cockpit enhances the pilot's performance thus improving the efficiency of the practice or testing session for the pilot.

Thus, substantial research and development has been directed to improving the focus of the projection tube. Improvements in the quality of the glass tube, the Schmidt optical projection system, the surface of the target member and the electron gun are included. In addition, efforts have been made to improve the structure of the target assembly, including the mounting arrangement for the target and the heat dissipating structure. The standard of the industry in this respect is shown in U.S. Pat. No. 4,177,400 to Hergenrother et al., issued Dec. 4, 1979. The target assembly is mounted on the internal face plate of the projection tube and held in position by a compression spring on one side and a tripod mounting pad on the other. Final tilt adjustment of the target member is provided by three set screws on the pad. The compression spring is designed to hold the center shaft screw in tension and maintain the target in the proper spatial relationship within the tube, and thus to secure the focus of the image of the tube.

While this prior art arrangement shown in the '400 patent has been successful, the projection tubes including this target assembly require extreme handling procedures. The problem is that after the focus is set by adjusting the set screws on the adjustment pad, this tube of the prior art can sometimes be knocked out of focus inadvertently by a relatively mild bump or jar. Such inadvertent shock loading can occur in any number of ways during the final stages of manufacturing, transporting to the OEM manufacturer, during actual installation and during subsequent use and servicing. Thus, it would be desirable to provide an improved target assembly that protects the target member from displacement and the tendency to tilt, and thus minimize the tendency to defocus the tube. Such support structure should be able to be economically manufactured, while at the same time holding the target member more rigidly. Also, it would be a plus to provide an arrangement allowing easier servicing and refocusing during the life of the tube in the unlikely event that it is required.

SUMMARY OF THE INVENTION

Thus, it is a primary object of the present invention to provide a target assembly for a projection cathode ray tube wherein the target member is protected from displacement and the shortcomings of the prior art are substantially overcome.

It is another object of the present invention to provide such a target assembly for a projection tube wherein the target member is held more rigidly than in the past, thus substantially eliminating the problem of defocusing due to target member tilting in response to inadvertent shock loading.

It is still another object of the present invention to provide an improved target assembly wherein the target member is supported in a very simple manner utilizing components similar to those of the prior art, and thereby not sacrificing the progress of the past and minimizing retraining of manufacturing and servicing personnel.

It is still another object of the present invention to provide the improved target assembly wherein a shaft screw is utilized to support the target member with positive locking means associated with the shaft screw to secure the target member relative to the tube, and thereby protect the tube from being defocused when subjected to inadvertent shock loading.

It is a related object and in accordance with the broader aspects of the present invention to provide a mounting of the type described for an assembly including a component requiring secure spatial mounting on a base and utilizing a shaft screw and positive locking means to rigidly secure the component in place, and thereby providing protection from being inadvertently shifted when subjected to shock loading.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved concept in target support for a projection cathode ray tube is provided. A target member of the tube is supported by a shaft screw and mounting means including an adjustment pad. After the initial focusing, the target member is maintained in the proper spatial relationship within the tube. Positive locking means for the adjustment pad secures the adjustment, so that the target member is protected from being inadvertently tilted and the tube defocused by shock loading. In accordance with the broader aspects of the present invention, any component similar to a target member requiring a secure spatial mounting on a base can be secured by the assembly of the invention.

In accordance with the preferred embodiment relating to the target assembly of a projection tube, the shaft screw threadedly engages the adjustment pad to replace the connection provided by the slip joint of the prior art arrangement, such as shown in the prior art U.S. Pat. No. '400, described above. The threaded engagement preferably takes the form of external threads on the shaft screw received by inside threads of a center aperture of said adjustment pad. A locking nut on the external threads of the shaft screw jams against the pad to thereby load the cooperating threads, thus substantially eliminating any chance of movement at this connection.

In relation to another connection within the target assembly, the inside of the shaft screw threadedly engages a mounting stud of the target member. A set screw in turn threadedly engages the same internal threads of the shaft screw for forcibly tightening down against the stud, and thereby locking the stud in place. This arrangement advantageously substantially eliminates inadvertent movement at this connection. The set screw loads the cooperating threads between the shaft screw and the mounting stud so that shock loading as a factor in defocusing of the tube is essentially eliminated. The shaft screw is preferably hollow providing easy access to the locking set screw enhancing the manufacturing, assembly and servicing process. At both connections, the improved mechanical locking provides the desired anti-tilt feature missing from the prior art. Of significance, the need for use of chemical compounds, such as Loctite, that has been tried in the past as a stop gap measure, is eliminated.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
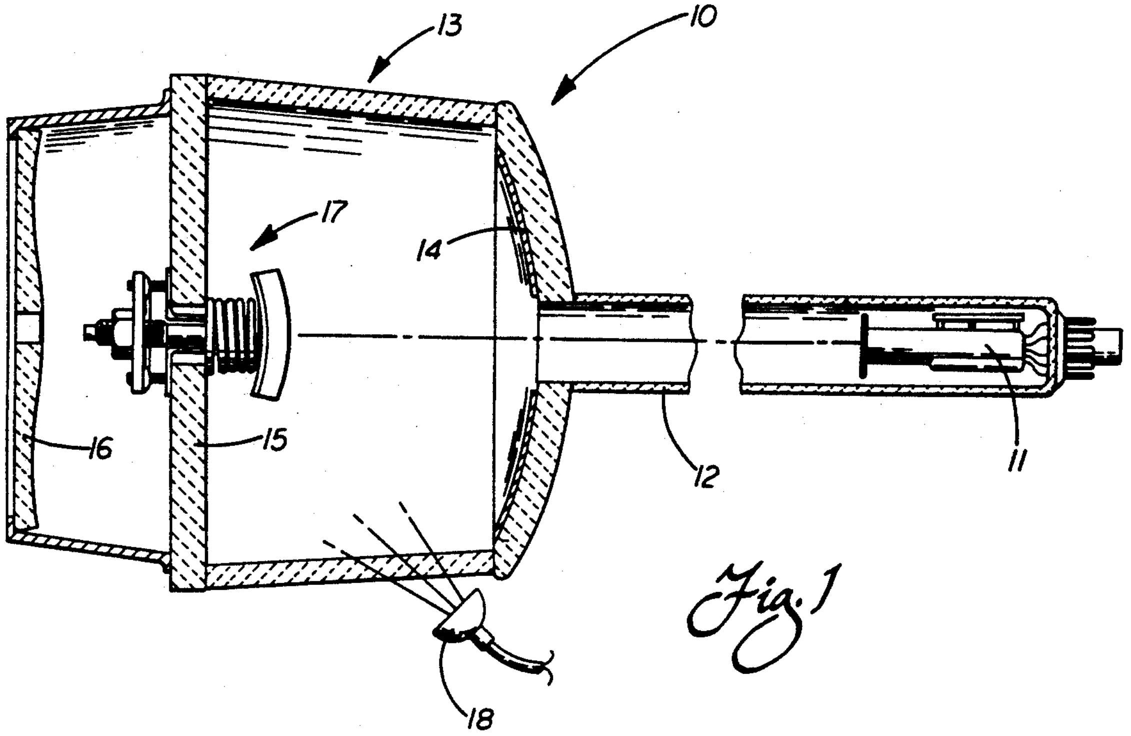
FIG. 1 is a longitudinal cross sectional view through a projection cathode ray tube in which the target assembly of the present invention is utilized.

By viewing FIG. 1, a more detailed view of a projection cathode ray tube 10 can be seen. The tube 10 includes an electron gun 11 mounted in an elongated neck portion 12 that opens into a body 13 of the tube. Along the entry wall, an annular concave mirror 14 is provided. An internal face plate 15 and correction lens 16 completes a a Schmidt optical projection system of the tube. The face plate mounts a target assembly 17 incorporating the principles of the present invention. In operation, the scanning electron beam generated by the electron gun 11 passes along the center axis of the projection tube 10, forms an image on the surface of the target assembly, whereupon the image is reflected by the mirror 14 and out through the correction lens 16 for viewing on a screen. A lamp 18 is provided to illuminate the interior of the body 13 including the target assembly 17, and thereby enhance the image being projected.

While the preferred embodiment of the present invention is thus being described as relating to a projection cathode ray tube 10, it will be realized that in accordance with the broader aspects, the concepts relate to any assembly having a component, such as within the target assembly 17, where it is required to provide a secure spatial mounting on a base. The manner in which this broader concept applies, will be more evident as the description of the preferred embodiment including the target assembly 17 in the environment of the projection tube 10 progresses.

While any suitable material having a low coefficient of expansion, easy machinability and relatively low cost can be used, the components of the target assembly 17 are preferably aluminum, with the exception of the shaft screw, which should be INVAR 36 metal alloy, or the equivalent.

Figure 2:
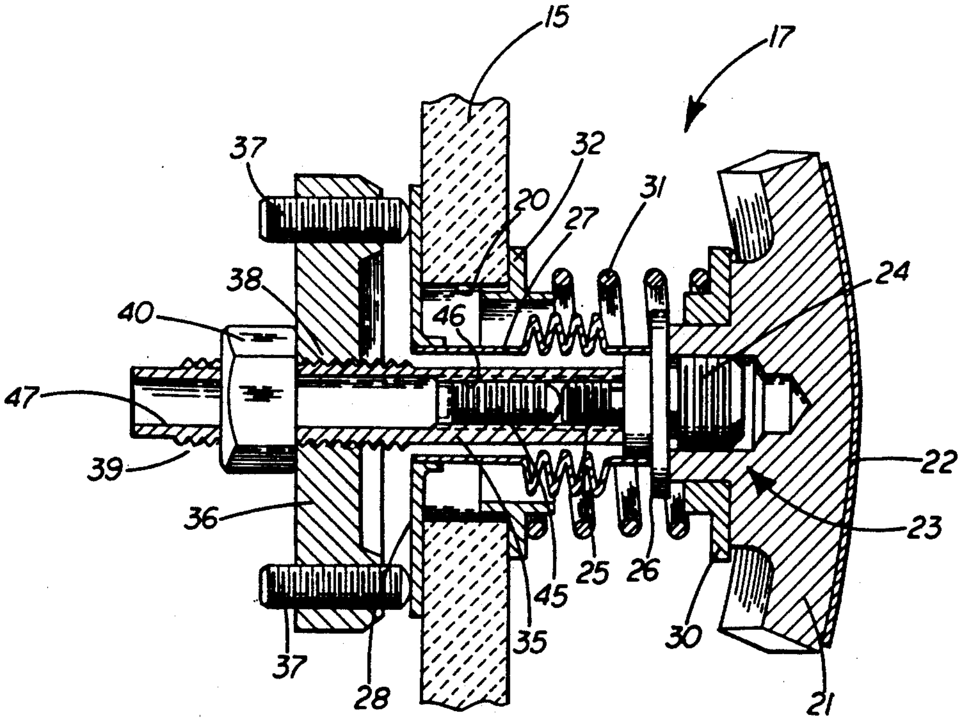
FIG. 2 is a cross sectional view through the target assembly and including an angled cut through the adjustment pad for clarity, and illustrating the locking arrangements of the present invention for the assembly.

In the cross sectional view of FIG. 2, the target assembly 17 and the manner in which it is mounted on the face plate 15 so as to be protected from being inadvertently tilted and defocused is featured. The face plate 15 forms a base including a central mounting opening 20 into which the target assembly 17 is securely mounted.

Specifically making up the target assembly 17 is a target member 21 having an outer curved face receiving an electron beam sensitive coating 22 upon which the image is formed in response to the scanning electron beam. The target member 21 includes a mounting stud, generally designated by the reference numeral 23, and including on one end a threaded portion 24 engaging a threaded opening in the back of the target member 21. On the opposite end of the stud 23 is a reduced size threaded portion 25 extending from a stepped collar 26 separating the two threaded portions 24, 25. Mating with the stepped collar 26 and sealing washer 28 on the face plate 15 is an isolation bellows 27 performing the important function of sealing the interior of the body 13 from ambient conditions.

The target assembly 17 also includes a mounting ring 30 mating with the back of the target member 21 and engaged by compression spring 31. The opposite end of the spring 31 is held in engagement with the face plate 15 through a flanged seating ring 32 centered within the opening 20.

The reduced threaded portion 25 of the stud 23 is connected to a hollow shaft screw 35 that forms a key component of the present invention. In turn, a tripod adjustment pad 36 with individual adjusting set screws 37 seated against the sealing washer 28 receives the opposite end of the shaft screw 35. The shaft screw 35 is externally threaded so as to engage inside threads within a center aperture 38. Advantageously, the threaded engagement between the external threaded section of the shaft screw 35 and the inside threads of the aperture 38 serve to provide positive locking means for the mounting of the target member 21. Outside forces, such as shock loading, are thus prevented from defocusing the tube. The conventional slip joint between the shaft screw 35 and the adjustment pad 36 utilized in the prior art arrangements is effectively eliminated. It is notable that the characteristic extended sleeve along the center aperture of the adjustment pad 36 is no longer needed. Thus, the size of the adjustment pad 36 is substantially reduced for better cost efficiency and allowing improved circulation around the shaft screw 35 for dissipating of the heat buildup.

A locking nut 40 engages the same external threads on the shaft screw 35 and is designed to be torqued sufficiently for jamming against the pad adjacent the threaded aperture 38 to thereby load the cooperating threads. The loading of the threads provides additional assurance that there is effective elimination of the potential for relative movement at this connection, even under shock loading.

To review the physical arrangement of the target assembly 17 in the tube 10 at this point, it is apparent that the target member 21 with the attached mounting stud 23 is now firmly positioned relative to the face plate 15 within the interior of the body 13. The spatial relationship is basically established by the mounting ring 30, the flanged seating ring 32, the spring 31 and the adjustment pad 36. This relationship is in turn secured by the two connections; i.e. the shaft screw 35 being screwed on the reduced threaded portion 25 of the stud 23 at one end and the threaded center aperture 38 of the tripod adjustment pad 36 screwed on the external threads of the shaft screw at the opposite end. The three adjusting set screws 37 acting against the sealing washer 28 maintain the compression of the spring 31, and by selective actuation provide the appropriate tilting and focusing movement of the positioning of the target member 21.

Proceeding now to review another important feature of the present invention, the shaft screw 35 receives a locking set screw 45 cooperating with its internal threads 46. For convenience, the set screw 45 and the threaded portion 25 of the stud 23 are the same size, and have the same threads. A hollow passage 47 is provided through which the set screw 45 can be positioned on the interior of the shaft screw. By inserting an Allen wrench through the passage 47, the set screw can be snugged up against the end of the mounting stud 23. Once the set screw 45 is torqued to the specified amount, the threads of the threaded portion 25 of the mounting stud 23 and the threads of the set screw are loaded with respect to the internal threads 46 of the shaft screw 35. Upon loading of these cooperating threads in this fashion, a more secure locking of this connection of the target assembly 17 is obtained.

As a result, the target member 21 is securely protected from shifting or tilting due to outside shock loading, or the like. The two connections of the shaft screw 35 are placed under positive threaded loading for maximum rigidity. Once the locking nut 40 and the locking set screw 45 are securely positioned, the anti-tilt feature is fully implemented and even relatively large shock loads, such as by bumping the projection tube during handling does not destroy the original focus. Furthermore, last minute manufacturing processes, such as blowing on the face of the target with an air stream to remove blemish particles is now possible without upsetting the focus of the tube. Other outside forces, such as thermal cycling of the components of the target assembly 17, are also prevented from loosening the connections and allowing deleterious shifting and tilting of the target member 21. Furthermore, installation and servicing is simplified in that all of the component parts are easily accessible. The critical threaded engagements forming the locking means of the connections also do not require the use of chemical coatings.

The foregoing description of a preferred embodiment of the invention has been presented for purposes of illustration or description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A target assembly for a projection cathode ray tube having a face plate comprising:
   - a target member having an electron beam sensitive coating for forming an image when excited by an electron beam;
   - a shaft screw for supporting said target member in spatial relationship in said tube;
   - mounting means for said shaft screw adapted to engage said face plate;
   - said mounting means including an adjustment pad for tilting said target member to focus the image of said projection tube; and
   - positive locking means for said mounting means to secure said target member in said spatial relationship spaced from said face plate to secure the focus;
   - whereby said target member is protected from being inadvertently tilted and the tube being defocused when subjected to shock loading.

2. The target assembly of claim 1 wherein said shaft screw threadedly engages said adjustment pad to form said locking means.

3. The target assembly of claim 2 wherein external threads on said shaft screw are received by inside threads of a center aperture of said adjustment pad.

4. The target assembly of claim 3 wherein is further provided a locking nut on said external threads for jamming against said pad adjacent said threaded aperture to thereby load the cooperating threads.

5. The target assembly of claim 1 wherein said target member includes a threaded mounting stud, said shaft screw threadedly engaging said stud by internal threads, and a set screw threadedly engaging said internal threads for tightening against said stud to thereby load the cooperating threads and form said locking means.

6. The target assembly of claim 5 wherein said shaft screw is hollow providing access to said locking set screw.

7. An assembly including an operating component for a shock sensitive apparatus requiring a secure spatial mounting relative to a base comprising:
   - a shaft screw for supporting said operating component in spatial relationship in said apparatus;
   - adjustable mounting means for said shaft screw adapted to engage said base; and
   - positive locking means for said mounting means to secure said operating component in said spatial relationship spaced from said base and to secure the spatial relationship;
   - whereby said operating component is protected from being inadvertently shifted when subjected to shock loading.

8. The assembly of claim 7 wherein said component includes a threaded mounting stud, said shaft screw threadedly engaging said stud by internal threads, and a set screw threadedly engaging said internal threads for tightening against said stud to thereby load the cooperating threads and form said locking means.

9. An assembly including an operating component for a shock sensitive apparatus requiring a secure spatial mounting relative to a base comprising:

a shaft screw for supporting said operative component in spatial relationship in said apparatus;
mounting means for said shaft screw; and
positive locking means for said mounting means to secure said operating component in said spatial relationship spaced from said base and to secure the spatial relationship;
wherein said mounting means includes an adjustment pad for said operating component, external threads on the shaft screw threadedly engaging inside threads of a center aperture of said pad to form said locking means;
whereby said operating component is protected from being inadvertently shifted when subjected to shock loading.

10. The assembly of claim 9 wherein is further provided a locking nut on said external threads for jamming against said pad adjacent said threaded aperture to thereby load the cooperating threads.

* * * * *